United States Patent
Ohtaki

Patent Number: 6,037,780
Date of Patent: Mar. 14, 2000

[54] DEVICE FOR MEASURING TRANSMISSION DELAY TIME IN A TRANSMISSION CABLE

[75] Inventor: Toshiyuki Ohtaki, Tokyo, Japan

[73] Assignee: Ando Electric Co., Ltd, Tokyo, Japan

[21] Appl. No.: 08/896,284

[22] Filed: Jul. 16, 1997

[30] Foreign Application Priority Data

Jul. 22, 1996 [JP] Japan ................................ 8-192401

[51] Int. Cl.⁷ ............................................... G01R 31/08
[52] U.S. Cl. ........................................ 324/535; 324/533
[58] Field of Search ................................. 324/532, 533, 324/534, 535, 539; 702/85, 89

[56] References Cited

U.S. PATENT DOCUMENTS 3,648,080  3/1972  Nakaya ................................ 307/293
5,420,512  5/1995  Spillane ............................... 324/539

FOREIGN PATENT DOCUMENTS 07270502  10/1995  Japan .

Primary Examiner—Josie Ballato
Assistant Examiner—Russell M. Kobert
Attorney, Agent, or Firm—Darby & Darby

[57] ABSTRACT

The object of the present invention is to offer a transmission line propagation delay time measuring device capable of reducing the measurement errors due to attenuation in transmission lines and allowing precise measurement of the transmission line propagation delay time. The invention comprises a test signal generating circuit 1 for generating a test signal for measuring the propagation delay time in a transmission line 3, a transmission line 3 having one end connected to the test signal generating circuit 1 via a measurement point at which the propagation delay time is measured and the other end open, a timing measuring circuit 5 for measuring the time required for the voltage at the measurement point 2 to reach a predetermined value, a data table 7 for storing transmission line attenuation values and measurement errors obtained by simulating the transmission line delay time measuring device as corrective data, and a computing circuit 6 for performing a propagation delay time corrective procedure by calculating a propagation delay time based on measurement values measured in the timing measuring circuit 5 and referring to the data table 7.

7 Claims, 9 Drawing Sheets

FIG.4

| ATTENUATION VALUE D | MEASUREMENT ERROR Terror |
|---|---|
| 0.8 | −88.908 |
| 1.0 | −111.3106 |
| ⋮ | ⋮ |

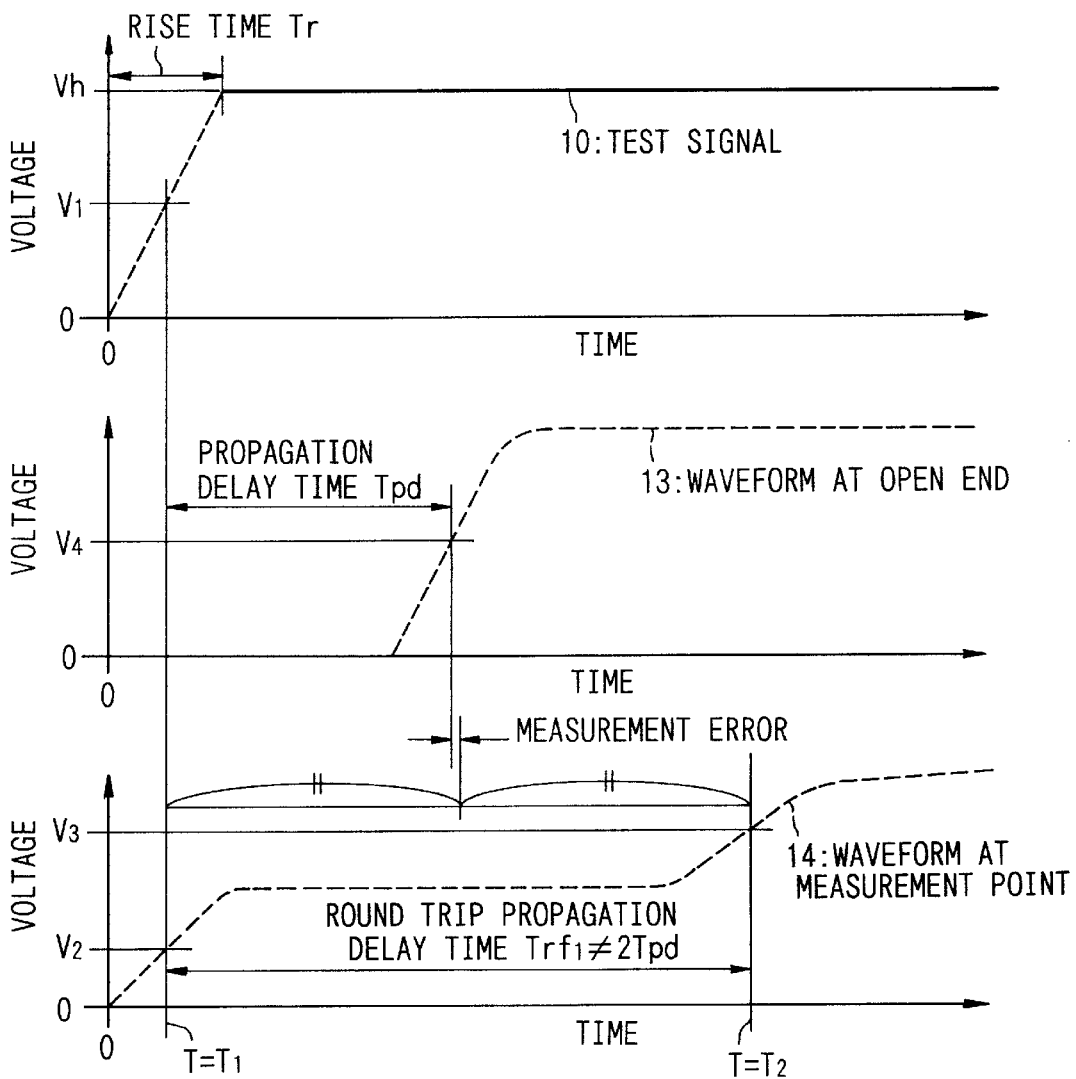

DEVICE FOR MEASURING TRANSMISSION DELAY TIME IN A TRANSMISSION CABLE

BACKGROUND OF THE INVENTION

1. Field of the Invention

The present invention relates to a transmission line propagation delay time measuring device for measuring the propagation delay time in transmission lines, more specifically to a technique for correcting the propagation delay time measured by TDR (Time Domain Reflectometer) methods.

2. Conventional Art

Next, a transmission line propagation delay time measuring device according to the conventional art shall be explained using FIGS. 6–8.

FIG. 6 is a block diagram showing an example of the structure of a conventional transmission line propagation delay time measuring device. FIG. 7 is a flow chart showing the procedural flow of the measuring method of FIG. 6. FIG. 8 is a waveform diagram showing an example of this procedure.

In FIG. 6, reference numeral 1 denotes a test signal generating circuit, reference numeral 2 denotes a measurement point at which waveform detection is performed, reference numeral 3 denotes a transmission line, reference numeral 4 denotes an open end of the transmission line 3, reference numeral 5 denotes a timing measuring circuit for measuring the time required for the waveform to reach an arbitrary voltage value, and reference numeral 8 denotes a computing circuit for performing the computation procedures of the propagation delay time based on the measured time.

Additionally, test signal 10 in FIG. 8 is the waveform of the test signal used for measurement, which is outputted by the test signal generating circuit 1. The voltage amplitude of the test signal 10 is $0-V_h$, and the rise time is $T_r$. Additionally, waveform 11 is the waveform at the open end 4, and waveform 12 is the waveform at the measurement point 2.

Next, the operations of the conventional art shall be explained using FIGS. 6–8.

First, a test signal 10 is supplied from the test signal generating circuit 1 to the transmission line 3.

Then, in order to determine the time at which the test signal 10 was supplied to the transmission line 3, the timing measuring circuit 5 measures the time $T_1$ at which the voltage of the waveform 12 at the measurement point 2 reaches voltage $V_2$ (S200).

Next, in order to determine the time at which the reflected wave reflected by the open end 4 returns, the timing measuring circuit 5 measures the time $T_2$ at which the voltage of the waveform 12 at the measurement point 2 reaches a voltage $V_3$ (S201).

Then, the computing circuit 8 calculates the difference $T_2-T_1$ between time $T_1$ and time $T_2$, as the propagation delay time $T_{rf1}$ for making a round trip of the transmission line 3.

Finally, the computing circuit 8 divides the value of the propagation delay time $T_{rf1}$ for making a round trip by 2, to calculate the propagation delay time $T_{pd}$ to the open end 4 of the transmission line 3.

However, this conventional art works only under the assumption of an ideal case in which there is no attenuation on the transmission line, attenuation of the signal does occur on the transmission line. For this reason, there are large measurement errors in the measurement method of the conventional art, and it is not possible to make any measurements of propagation delay time with high precision.

Next, in order to clarify this point, the case wherein attenuation occurs on the transmission line will be explained with reference to FIG. 9.

FIG. 9 is a waveform diagram showing an example of the procedure for the case wherein attenuation occurs on the transmission line 3.

In this drawing, waveform 13 is the waveform at the open end 4 when attenuation occurs in the transmission line 3 and the waveform is blunted, and waveform 14 is the waveform at the measurement point 2 when attenuation occurs in the transmission line and the waveform is blunted. Everything else is the same as FIG. 8.

In this case, as shown in FIG. 9, when the waveform is blunted as with waveform 13 at the open end and waveform 14 at the measurement point, the propagation delay time $T_{rf1}$ for the round trip is not equal to twice the propagation delay time $T_{pd}$ to the open end 4, and a measurement error $T_{error}$ occurs. For example, in the case of short time measurements on the order of nanoseconds, measurement errors $T_{error}$ of several hundred picoseconds can be expected.

SUMMARY OF THE INVENTION

The present invention has been achieved in view of this background, and has the object of offering a transmission line propagation delay time measuring device capable of reducing the measurement errors due to attenuation in the transmission line and allowing precise measurement of the transmission line propagation delay time.

The present invention is a transmission line propagation delay time measuring device for measuring propagation delay time in transmission lines by sending a test signal through a transmission line which is reflected at an open end, and detecting the reflected wave which returns to a measurement point, the transmission line propagation delay time measuring device comprising test signal generating means for generating the test signal for measuring propagation delay time in a transmission line; a transmission line having one end connected to the test signal generating means via a measurement point at which the propagation delay time is measured, and the other end open; timing measuring means for measuring the time required for the voltage at the measurement point to reach a predetermined voltage value; memory means for storing as corrective data the correlation between attenuation values and measurement errors in the transmission line obtained by simulating the transmission line propagation delay time measuring device; and computing means for performing a propagation delay time corrective procedure by calculating a propagation delay time from the measurement values measured by the timing measuring means and referring to the memory means.

With this invention, since the propagation delay time measurement values are linearly interpolated in consideration of attenuation on the transmission line, measurement errors are reduced in comparison to conventional measurement methods, and precise propagation delay times can be measured.

BRIEF DESCRIPTION OF THE DRAWINGS

FIG. 4 is a diagram for explaining an example of a data table 7 according to the same embodiment.

FIG. 9 is a waveform diagram showing an example of the procedure for the case in which attenuation does occur on the transmission line.

DESCRIPTION OF PREFERRED EMBODIMENTS OF THE INVENTION

Hereinbelow, embodiments of the transmission line propagation delay time measuring device according to the present invention shall be explained with reference to the drawings.

Figure 1:
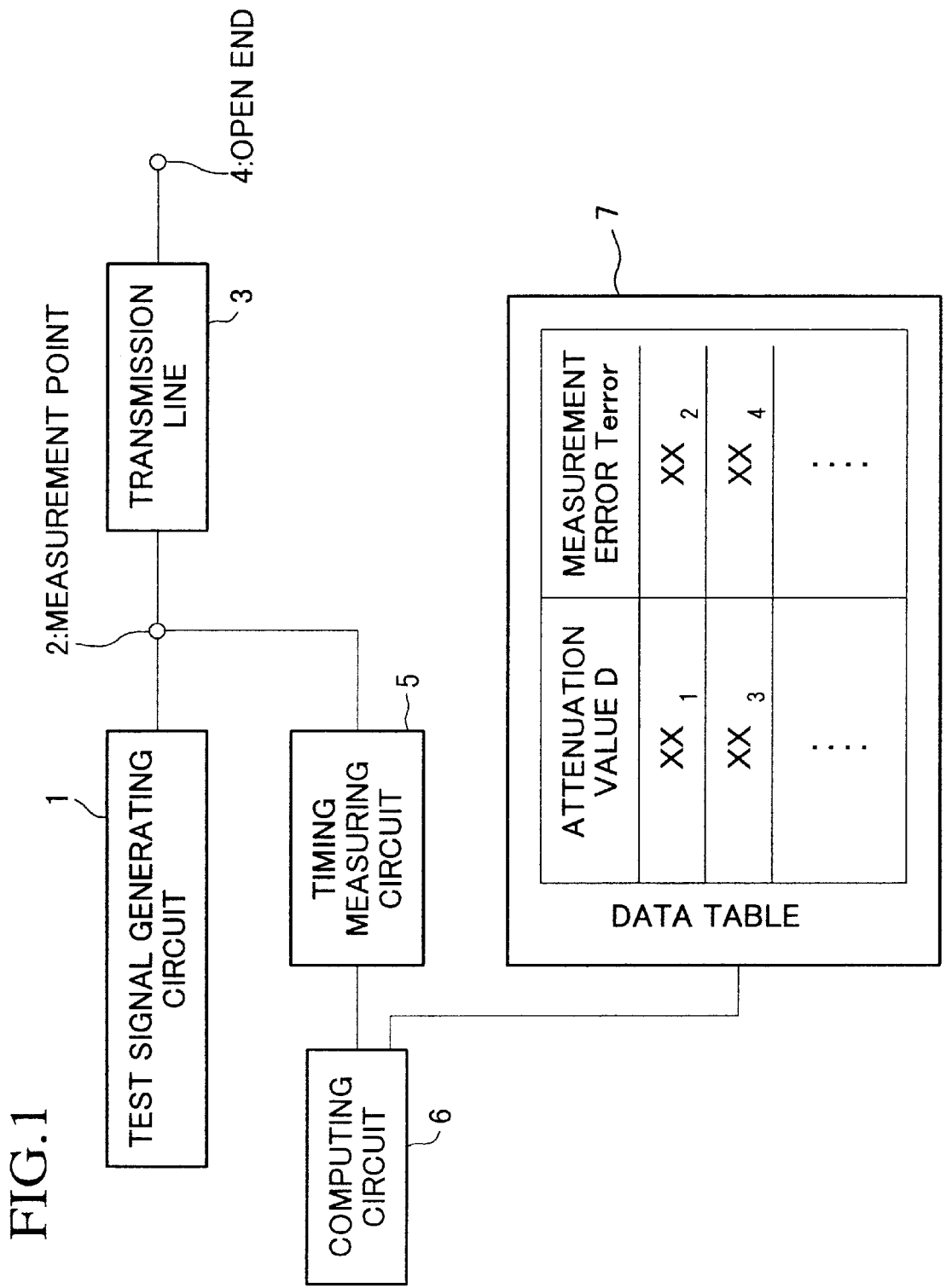
FIG. 1 is a block diagram showing an example of the structure of a transmission line propagation delay time measuring device according to an embodiment of the present invention.
Figure 2:
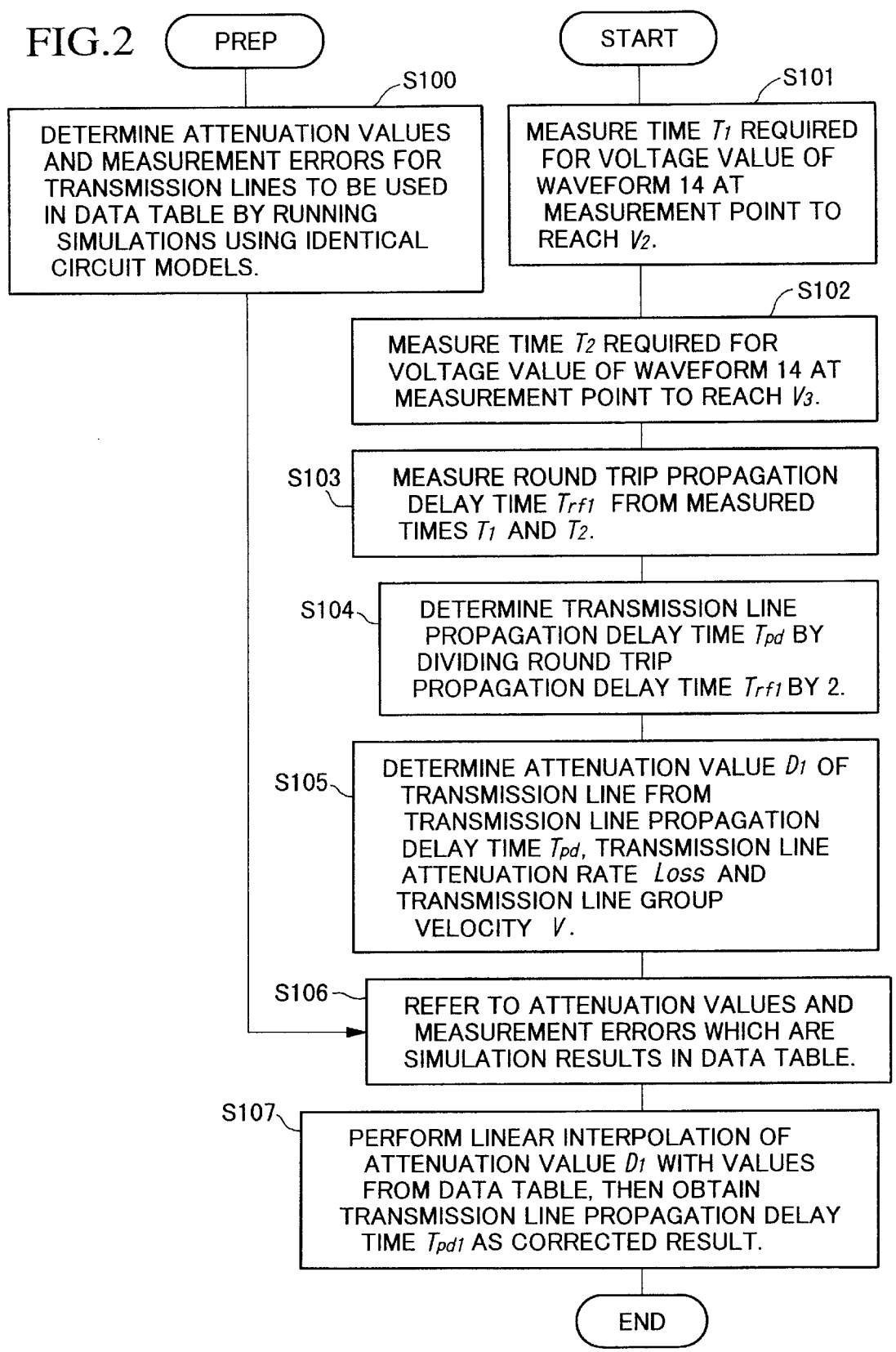
FIG. 2 is a flow chart showing an example of the operations of a transmission line propagation delay time measuring device according to the same embodiment.

FIGS. 1, 2 and 9 show an embodiment of the transmission line propagation delay time measuring device according to the present invention.

FIG. 1 is a block diagram showing an example of the structure of a transmission line propagation delay time measuring device according to an embodiment of the present invention.

Figure 6:
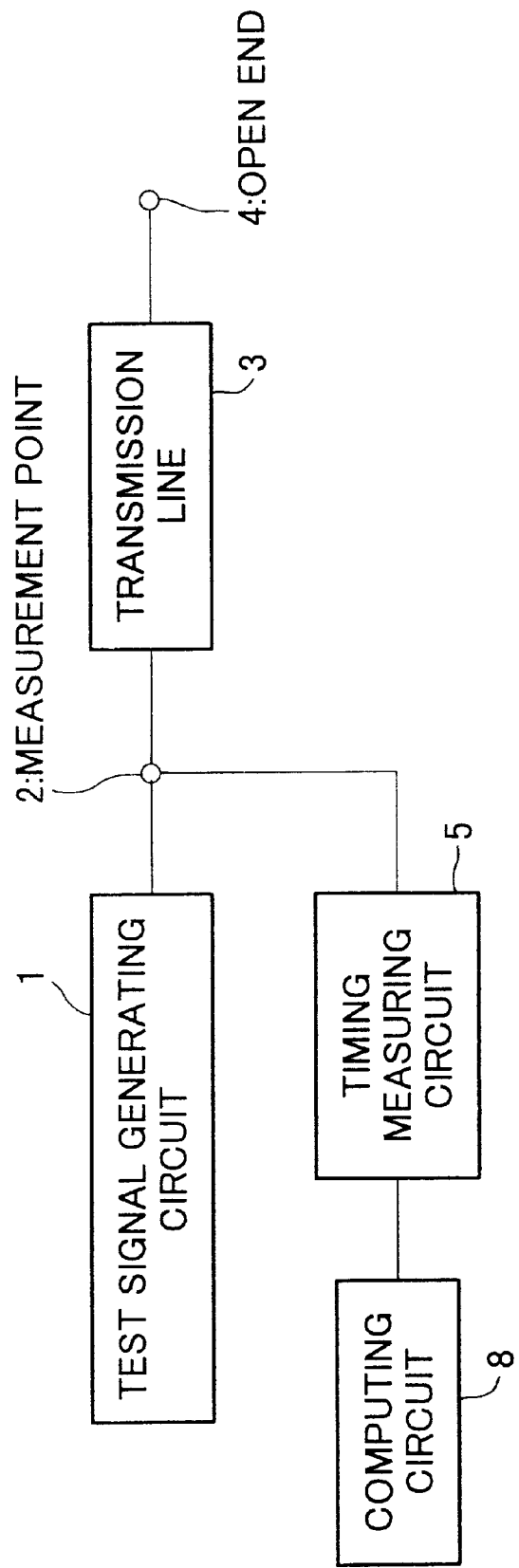
FIG. 6 is a block diagram showing an example of the structure of a conventional transmission line propagation delay time measuring device.

In this drawing, the portions which correspond to portions shown in FIG. 6 are labeled with the same reference numerals, and their explanations are omitted. In the transmission line propagation delay time measuring device shown in the drawing, a computing circuit 6 is provided instead of the computing circuit 8, and a data table 7 is also added.

The data table 7 is a data table which stores corrective data determined by running simulations on an identical circuit model. The corrective data is composed of a transmission line attenuation value D and a measurement error $T_{error}$.

FIG. 2 is a flow chart showing an example of the operations of a transmission line propagation delay time measuring device according to the present embodiment.

Figure 7:
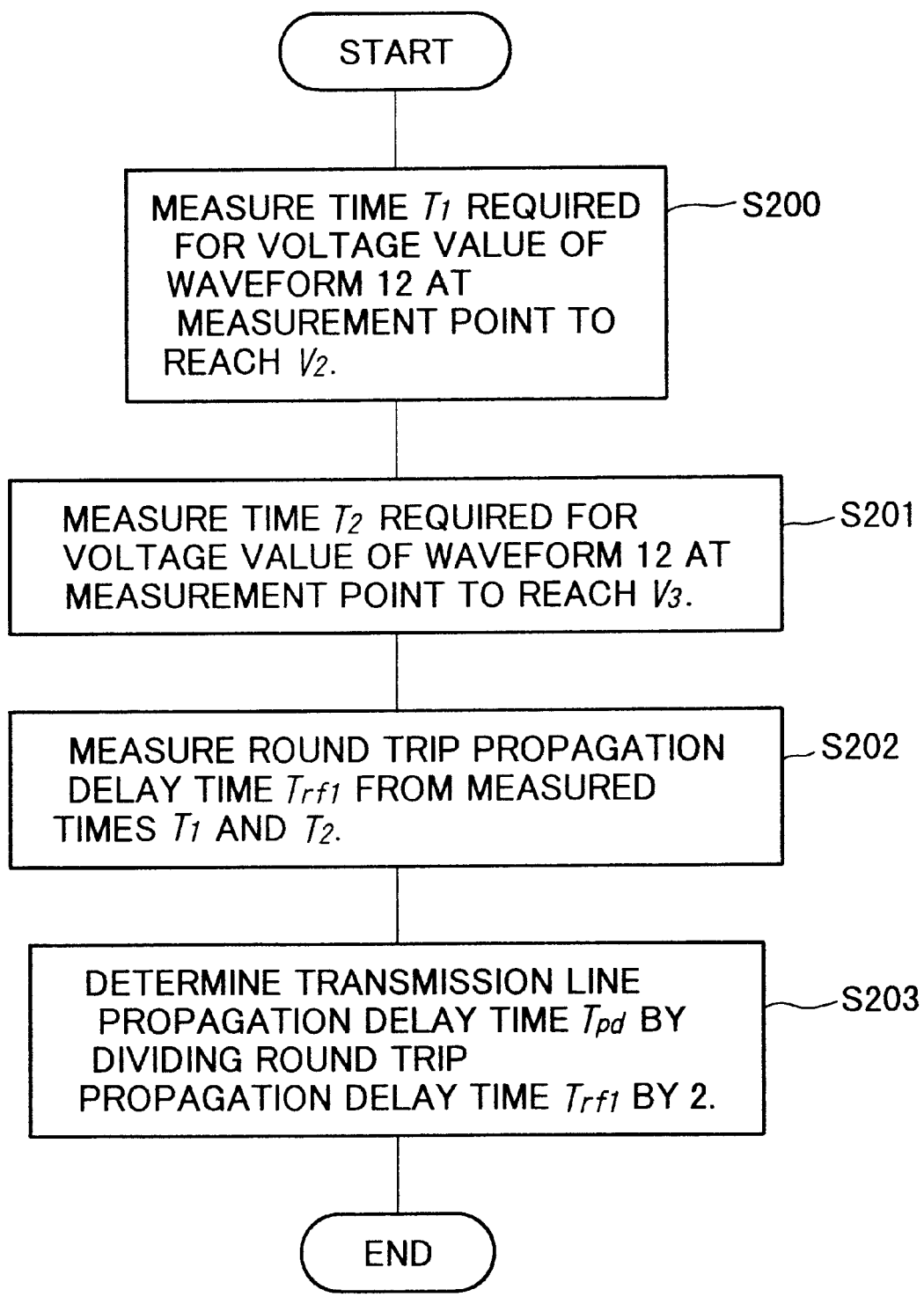
FIG. 7 is a flow chart showing an example of the operations of a conventional transmission line propagation delay time measuring device.
Figure 8:
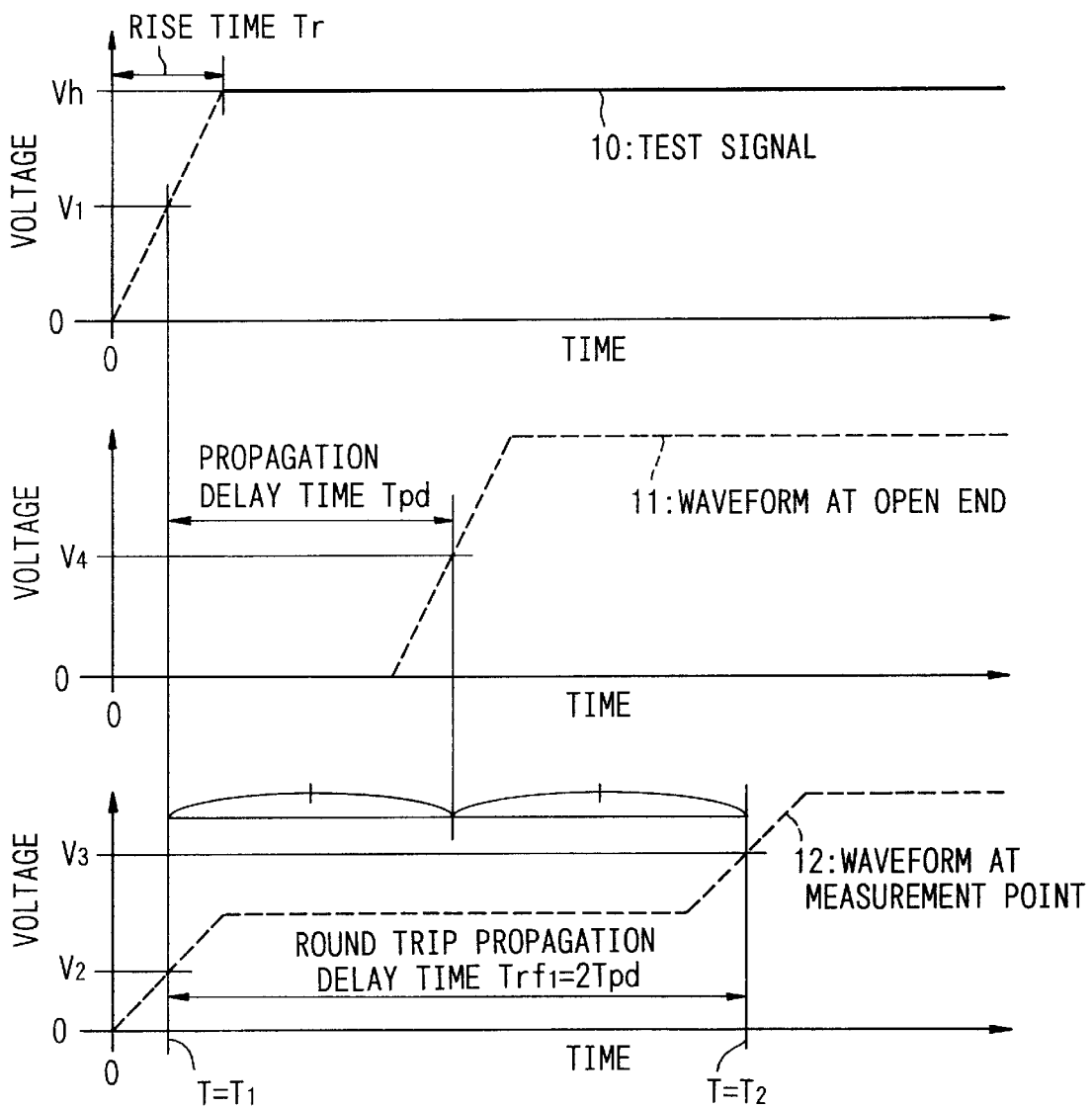
FIG. 8 is a waveform diagram showing an example of the procedure for the case in which attenuation does not occur on the transmission line.

That is, while the conventional computing circuit 8 runs steps S202–S203 (see FIG. 7), the computing circuit 6 of the present embodiment runs steps S103–S107 (see FIG. 2).

Furthermore, step S100 for finding data in the data table 7 is newly added.

Next, the operations of the transmission line propagation delay time measuring device according to the above structure shall be explained.

First, a data table 7 (see FIG. 1) is prepared before taking any measurements of the transmission line propagation delay time.

That is, simulations are preliminarily run on a circuit model identical to that of FIG. 1, in order to determine corrective data composed of the measurement error $T_{error}$ and the attenuation value D of the transmission line according to a conventional measurement method. In these simulations, the length L of the transmission line 3 and the rise time T of a test signal 10 identical to the test signal used for measurement are made constant, and the correlation between the attenuation value D and the measurement error $T_{error}$ is determined by sequentially changing the attenuation rate Loss of the transmission line 3 as a variable (step S100).

After the data table 7 is completed, the transmission line propagation delay time is measured next.

First, a test signal 10 is supplied from the test signal generating circuit 1 to the transmission line 3.

Then, in order to determine the time at which the test signal 10 was supplied to the transmission line 3, the timing measuring circuit 5 measures the time $T_1$ required for the voltage of the waveform 14 at measurement point 2 to become equal to voltage $V_2$ (S101).

Next, in order to determine the time required for the reflected wave reflected by the open end 4 to return, the timing measuring circuit 5 measures the time $T_2$ required for the voltage of the waveform 14 at the measurement point 2 to become equal to voltage $V_3$ (S102).

Next, the computing circuit 6 calculates the difference $T_2-T_1$ between time $T_1$ and time $T_2$, as the propagation delay time $T_{rf1}$ for making a round trip of the transmission line 3 (S103).

Then, the computing circuit 6 divides the value of the propagation delay time $T_{rf1}$ for making a round trip by 2, to calculate the propagation delay time $T_{pd}$ to the open end 4 of the transmission line 3 (S104).

Next, the computing circuit 6 determines the attenuation value $D_1$ of the transmission line 3 from the propagation delay time $T_{pd}$, the attenuation rate Loss in the transmission line 3 and the group velocity V of the transmission line 3 (S105). The equation for computing $D_1$ is shown by Equation (1) below.

$$D_1 = \text{Loss} \times T_{pd} \times V \quad (1)$$

Furthermore, the computing circuit 6 reads the corrective data for the attenuation value D and the measurement error $T_{error}$ obtained by the simulations from the data table 7 (S106).

At this time, the corrective data read from the data table are the measurement errors $T_{error}$ corresponding to the two attenuation values D closest to the attenuation value $D_1$ of the transmission line 3. For example, in the data table shown in FIG. 1, if $XX_1 < $ attenuation value $D_1$ of transmission line $3 < XX_3$, then the measurement errors $XX_2$ and $XX_4$ corresponding to $XX_1$ and $XX_3$ are read out.

Next, the computing circuit 6 determines the corrective measurement error $T_{error1}$ by linear interpolation using the measurement errors $XX_2$ and $XX_4$ corresponding to the attenuation values $XX_1$ and $XX_3$ from the relationship between the attenuation value $D_1$ determined by measurement and the attenuation value D in the data table 7 (step 107). The equation for computing $T_{error}$ is shown by Equation (2) below.

$$T_{error1} = \frac{(XX_4 - XX_2)(D_1 - XX_1)}{(XX_3 - XX_1)} + XX_2 \quad (2)$$

Then, the computing circuit 6 subtracts the corrective measurement error $T_{error}$ from the propagation delay time $T_{pd}$ determined from the times $T_1$ and $T_2$, so as to result in a propagation delay time $T_{pd}$, having smaller errors.

While an embodiment of the present invention has been explained in detail above, the specific structure is not necessarily limited to this embodiment, and any design modifications which do not stray from the gist of the present invention are included within the scope of the invention.

EXAMPLE

Next, a specific working example of a transmission line propagation delay time measuring device according to the present invention shall be explained with reference to the drawings.

Figure 3:
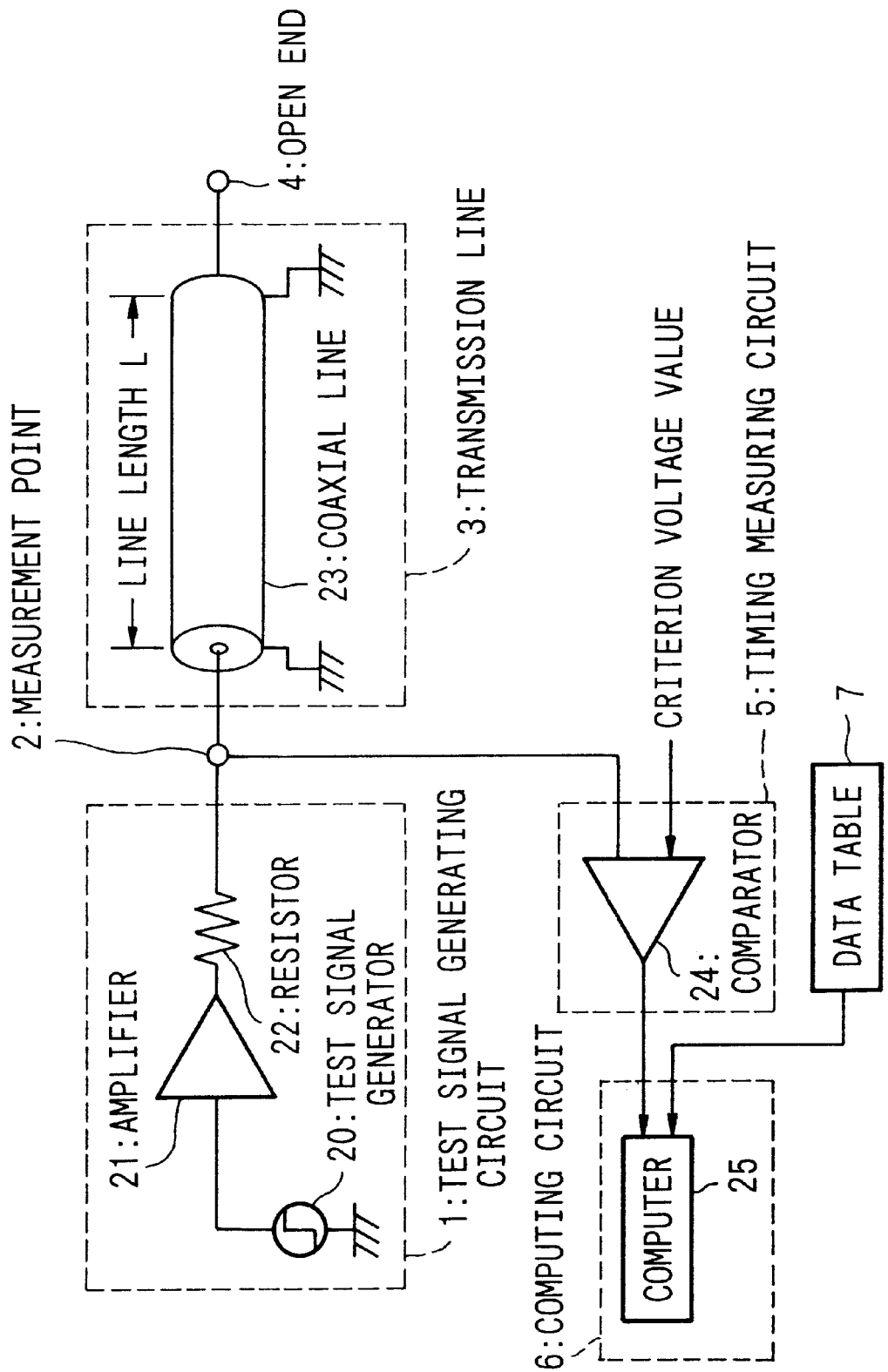
FIG. 3 is a block diagram showing an example of the structure of a transmission line propagation delay time measuring device according to an embodiment of the present invention.
Figure 5:
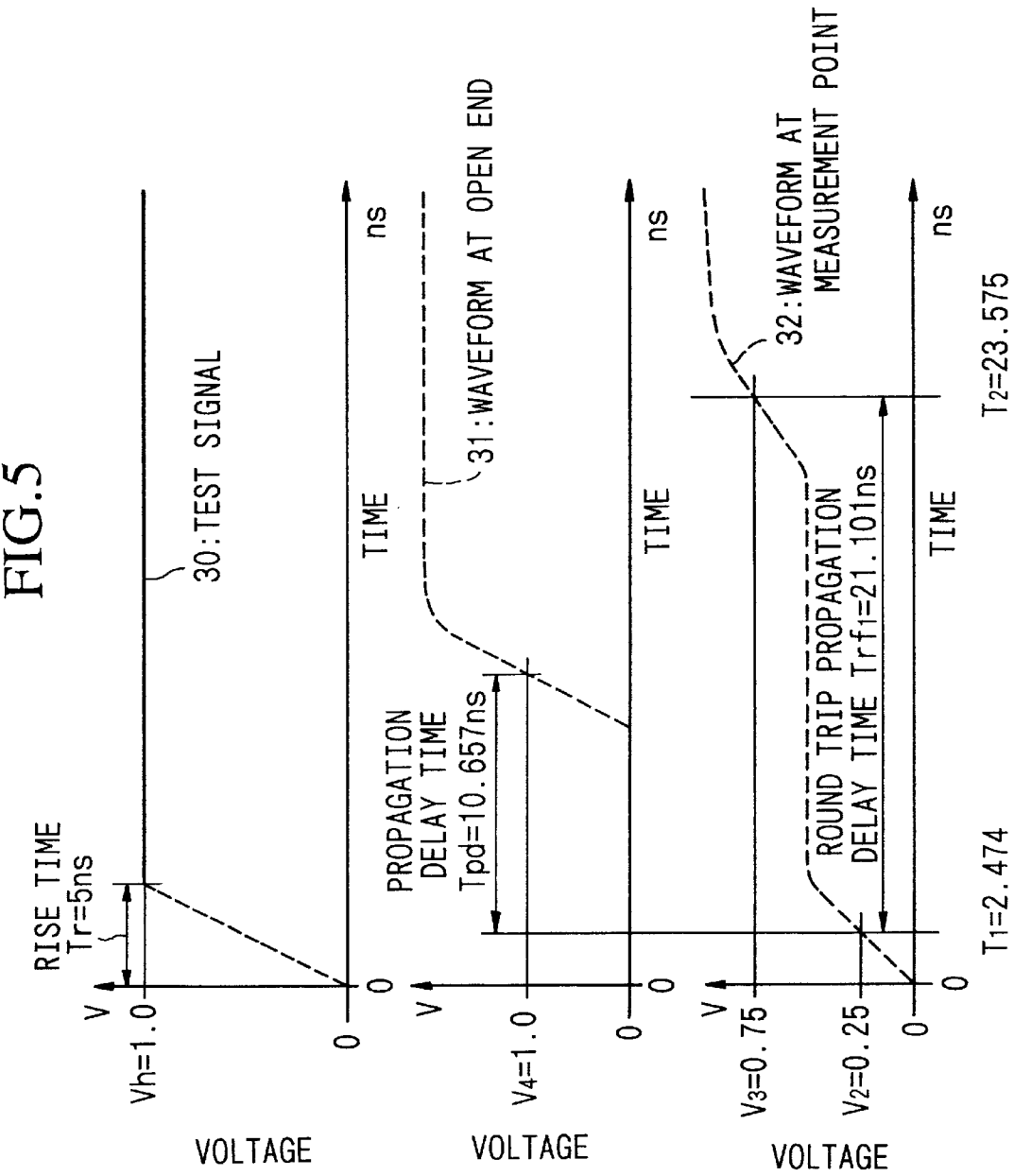
FIG. 5 is a waveform diagram showing an example of the procedure according to the same embodiment.

FIGS. 3–5 show a specific working example of a transmission line propagation delay time measuring device according to the present invention.

FIG. 3 is a block diagram showing an example of the structure of a transmission line propagation delay time measuring device according to the present example.

As shown in FIG. 3, the test signal generating circuit 1 is composed of a test signal generator 20, an amplifier 21 having an amplification factor of 1, and a 50 Ω resistor 22. FIG. 4 is a diagram showing an example of data table 7 according to the present embodiment.

Additionally, the transmission line 3 is composed of a coaxial line 23 having a length of 2 m and an attenuation rate Loss$_1$ of 0.45 dB/m (f$_o$=100 MHz).

The timing measuring circuit 5 is composed of a comparator 24 having a criterion voltage value V$_2$ (see FIG. 5) of 0.25 V, and a criterion voltage value V$_3$ (see FIG. 5) of 0.75 V.

The data table 7 is a table showing the correlation between the attenuation value D of the transmission line 3 (coaxial line 23) and the measurement error T$_{error}$, and a portion is shown in Table 4.

Here, the attenuation value D is determined from the propagation delay time T$_{pd}$ according to a simulation wherein the length L of the coaxial line 23 is 2 m, the attenuation rate Loss is 0.4 dB/m and 0.5 dB/m (f$_o$=100 MHz) and the rise time T$_r$ of the test signal 30 (see FIG. 5) is 5 ns, the respective attenuation rates Loss mentioned above (0.4 dB/m and 0.5 dB/m), and the group velocity V (200×10$^6$ m/s) of the coaxial line 23.

Additionally, the computing circuit 6 shown in FIG. 3 is composed of a computer 25 which receives the comparison results from the comparator 24 and the corrective data from the data table 7 as inputs.

FIG. 5 is a waveform diagram showing an example of the procedure according to the present example.

In this diagram, the test signal 30 is the waveform of the test signal used for measurement, the voltage amplitude of the test signal 30 is 1 V, and the rise time is 5 ns.

Additionally, waveform 31 is the waveform at the open end 4, and waveform 32 is the waveform at the measurement point 2.

With this type of structure, when a test signal 30 was supplied from the test signal generating circuit 1 to the transmission line 3 and the waveform 32 was measured at the measurement point 2, the time T$_1$ at which the voltage of the waveform 32 reached voltage V$_2$ (=0.25 V) was 2.474 ns, and the time T$_2$ at which the voltage of the waveform 32 reached voltage V$_3$ (=0.75 V) was 23.575 ns.

Hence, the round trip propagation delay time T$_{rf1}$ as calculated by T$_2$−T$_1$ was 21.101 ns. Furthermore, the propagation delay time T$_{pd}$ of the coaxial line 23 as calculated from this value was 10.551 ns, as shown in Equation (3).

$$T_{pd} = \frac{T_{rfl}}{2} = \frac{21.101}{2} = 10.551 \text{ ns} \qquad (3)$$

Next, the attenuation value D$_1$ of the coaxial line 23 was 0.9496 dB, as shown in Equation (4).

$$D_1 = 0.45 \times 10.551 \times 10^{-9} \times 200 \times 10^6 \qquad (4)$$
$$= 0.9496 \text{ dB}$$

Then, the computing circuit 6 reads the measurement errors T$_{error}$ (−88.908 and −111.3106) corresponding to the two attenuation values D (0.8 dB and 1.0 dB; see FIG. 4) closest to the calculated attenuation value D$_1$ (=0.9496 dB) from the data table 7.

Next, the computing circuit 6 finds the corrective measurement error T$_{error1}$ based on these measurement errors T$_{error}$ by linear interpolation as shown in Equation (5).

$$T_{error1} = \frac{(-111.3106 + 88.908)(0.9496 - 0.8)}{(1.0 - 0.8)} - 88.908 \qquad (5)$$
$$= -105.6651 \text{ ps}$$

Finally, the propagation delay time T$_{pd1}$ which is the final corrected result is obtained by subtracting the corrective measurement error T$_{error1}$ from the measured propagation delay time T$_{pd}$.

$$T_{pd1} = T_{pd} - T_{error1} \qquad (6)$$
$$= 10.551 \text{ ns} + 0.1056651 \text{ ns}$$
$$= 10.657 \text{ ns}$$

In the present example, the propagation delay time of the coaxial line 23 was 10.657 ns and the propagation delay time obtained after correction by the present invention was 10.657 ns.

I claim:

1. A transmission line propagation delay time measuring device for measuring propagation delay time in transmission lines by sending a test signal through a transmission line which is reflected at an open end, and detecting the reflected wave which returns to a measurement point, said transmission line propagation delay time measuring device comprising:

test signal generating means for generating said test signal for measuring propagation delay time in a transmission line;

a transmission line having one end connected to said test signal generating means via a measurement point at which the propagation delay time is measured, and the other end open;

timing measuring means for measuring the time required for the voltage at the measurement point to reach a predetermined voltage value;

memory means for storing as corrective data the correlation between attenuation values and measurement errors in the transmission line obtained by simulating said transmission line propagation delay time measuring device; and computing means for performing a propagation delay time corrective procedure by calculating a propagation delay time from the measurement values measured by said timing measuring means and correcting said propagation delay times based on said correlation between the attenuation values and measurement error stored in said memory means.

2. A transmission line propagation delay time measuring device in accordance with claim 1, wherein said timing measuring means measures the times required for the voltage at the measurement point to reach a predetermined voltage value and a second voltage value different from said predetermined voltage value; said computing means determines a pre-correction propagation delay time by dividing the difference between the two times measured by said timing measuring means by 2, determines an attenuation value of said transmission line, reads the two attenuation values closest to the attenuation value of said transmission line and the measurement errors corresponding to these two attenuation values from said memory means, calculates a corrective measurement error by linear interpolation using the attenuation value of said transmission line and the two attenuation values and measurement errors which have been read out, and subtracts the corrective measurement error from the pre-correction propagation delay time.

3. A transmission line propagation delay time measuring device in accordance with claim 2, wherein said computing means determines the attenuation value $D_1$ of the transmission line by performing the calculation:

$$D_1 = \text{Loss} \times T_{pd} \times V$$

where Loss represents the attenuation rate in said transmission line, $T_{pd}$ represents the pre-correction propagation delay time, and V represents the group velocity of said transmission line.

4. A transmission line propagation delay time measuring device for measuring propagation delay time in transmission lines by sending a test signal through a transmission line which is reflected at an open end, and detecting the reflected wave which returns to a measurement point, said transmission line propagation delay time measuring device comprising:

test signal generating means for generating said test signal for measuring propagation delay time in a transmission line;

a transmission line having one end connected to said test signal generating means via a measurement point at which the propagation delay time is measured, and the other end open;

timing measuring means for measuring the time required for the voltage at the measurement point to reach each of a predetermined voltage value and a second voltage value different from said predetermined voltage value;

memory means for storing as corrective data the correlation between attenuation values and measurement errors in the transmission line obtained by simulating said transmission line propagation delay time measuring device; and computing means for performing a propagation delay time corrective procedure by calculating a propagation delay time from the measurement values measured by said timing measuring means and wherein:

said computing means determines a pre-correction propagation delay time by dividing the difference between the two times measured by said timing measuring means by 2, determines an attenuation value of said transmission line, reads the two attenuation values closest to the attenuation value of said transmission line and the measurement error corresponding to these two attenuation values from said memory means, calculates a corrective measurement error by linear interpolation using the attenuation value of said transmission line and the two attenuation values and measurement error which have been read out, and subtracts the corrective measurement error from the pre-correction propagation delay time; and said corrective measurement error is determined by calculating $T_{error1} = \{(XX_4 - XX_2)(D_1 - XX_1)\}/(XX_3 - XX_1) + XX_2$, where $D_1$ represents the attenuation value of said transmission line, $XX_1$ and $XX_3$ represent the two attenuation values closes to said attenuation value $D_1$, $XX_2$ represents the measurement error corresponding to attenuation value $XX_1$, $XX_1$ represents the measurement error corresponding to attenuation value $XX_3$, and $T_{error1}$ represents the corrective measurement error.

5. A method for measuring propagation delay time in transmission lines comprising:

sending a test signal at a measurement point of a transmission line through the transmission line which signal is reflected at an open end;

detecting the reflected wave which returns to the measurement point at which propagation delay time is measured;

measuring the time required for the voltage at the measurement point to reach a predetermined voltage value;

producing and storing in memory means as corrective data the correlation between attenuation values and measurement errors in the transmission line obtained by simulating said transmission line propagation delay time measuring device; and performing a propagation delay time corrective procedure by calculating a propagation delay time from the measurement values measured by said timing measuring means and referring to said memory means and correcting the propagation delay times based on said correlation between the attenuation values and measurement error.

6. A transmission line propagation delay time measuring method in accordance with claim 5 wherein said timing measuring step comprises:

measuring the times required for the voltage at the measurement point to reach a predetermined voltage value and a second voltage value different from said predetermined voltage value, said performing step comprising determining a pre-correction propagation delay time by dividing the difference between the two times measured by said timing measuring means by 2, determining an attenuation value of said transmission line, reading the two attenuation values closest to the attenuation value of said transmission line and the measurement errors corresponding to these two attenuation values from said memory means, and said calculating portion of said performing a corrective procedure comprises calculating a corrective measurement error by linear interpolation using the attenuation value of said transmission line and the two attenuation values and measurement errors which have been read out from said memory means, and subtracting the corrective measurement error from the pre-correction propagation delay time.

7. A transmission line propagation delay time measuring method in accordance with claim 6, wherein said computing means determines the attenuation value $D_1$ of the transmission line by performing the calculation:

$$D_1 = \text{Loss} \times T_{pd} \times V$$

where Loss represents the attenuation rate in said transmission line, $T_{pd}$ represents the pre-correction propagation delay time, and V represents the group velocity of said transmission line.

* * * * *